(12) United States Patent
Iijima et al.

(10) Patent No.: US 10,106,640 B2
(45) Date of Patent: Oct. 23, 2018

(54) POLYMERIZABLE COMPOSITION, TRANSPARENT RESIN, OPTICAL MATERIAL, PLASTIC LENS, AND METHOD FOR MANUFACTURING TRANSPARENT RESIN

(71) Applicant: HOYA LENS THAILAND LTD., Prachatipat, Thanyaburi, Patumthanl (TH)

(72) Inventors: Takayuki Iijima, Tokyo (JP); Masahisa Kousaka, Tokyo (JP)

(73) Assignee: HOYA LENS THAILAND LTD., Patumthani (TH)

( * ) Notice: Subject to any disclaimer, the term of this patent is extended or adjusted under 35 U.S.C. 154(b) by 0 days.

(21) Appl. No.: 15/515,287

(22) PCT Filed: Sep. 9, 2015

(86) PCT No.: PCT/JP2015/075664
§ 371 (c)(1),
(2) Date: Mar. 29, 2017

(87) PCT Pub. No.: WO2016/052120
PCT Pub. Date: Apr. 7, 2016

(65) Prior Publication Data
US 2017/0240683 A1  Aug. 24, 2017

(30) Foreign Application Priority Data
Sep. 30, 2014  (JP) ................................. 2014-202415

(51) Int. Cl.
*C08G 18/38* (2006.01)
*G02B 1/04* (2006.01)
*C08G 18/76* (2006.01)
*C08G 18/24* (2006.01)
*C08G 18/73* (2006.01)

(52) U.S. Cl.
CPC ....... *C08G 18/3876* (2013.01); *C08G 18/242* (2013.01); *C08G 18/73* (2013.01); *C08G 18/7621* (2013.01); *C08G 18/7642* (2013.01); *C08G 18/7671* (2013.01); *G02B 1/041* (2013.01)

(58) Field of Classification Search
CPC .. C08G 18/3876; C08G 18/242; C08G 18/73; C08G 18/7621; C08G 18/7642; C08G 18/7671; G02B 1/041
See application file for complete search history.

(56) References Cited

U.S. PATENT DOCUMENTS

| 3,981,901 A | 9/1976 | Guthrie et al. |
| 2004/0026658 A1 | 2/2004 | Yoshimura et al. |
| 2007/0270548 A1 | 11/2007 | Bojkova et al. |
| 2008/0027198 A1 | 1/2008 | Naruse et al. |
| 2009/0270583 A1* | 10/2009 | Kuma ................... C07C 319/12 528/85 |
| 2011/0224371 A1 | 9/2011 | Ryu et al. |
| 2012/0225996 A1 | 9/2012 | Kawato et al. |
| 2014/0243496 A1* | 8/2014 | Kousaka .............. C08G 18/798 528/80 |
| 2015/0166718 A1* | 6/2015 | Okamoto ................. G02B 1/04 528/73 |

FOREIGN PATENT DOCUMENTS

| EP | 0 676 428 A1 | 10/1995 |
| JP | S60-199016 A | 10/1985 |
| JP | S63-46213 A | 2/1988 |
| JP | H10-120646 A | 5/1998 |
| JP | 2000-047003 † | 2/2000 |
| JP | 2000-047003 A | 2/2000 |
| JP | 2001-039945 A | 2/2001 |
| JP | 2005-336104 A | 12/2005 |
| JP | 2005336104 A * | 12/2005 |
| JP | 2009-057493 A | 3/2009 |
| JP | 2009-536257 A | 10/2009 |
| JP | 2010-235840 A | 10/2010 |
| JP | 2011-084479 † | 4/2011 |
| JP | 2011-084479 A | 4/2011 |
| JP | 2011-088933 A | 5/2011 |
| JP | 2011-126822 † | 6/2011 |
| JP | 2011-126822 A | 6/2011 |

(Continued)

OTHER PUBLICATIONS

JP-2005336104_English Translation (Year: 2005).*
Dec. 22, 2015 International Search Report issued in International Patent Application No. PCT/JP2015/075664.

*Primary Examiner* — Michael L Leonard
(74) *Attorney, Agent, or Firm* — Oliff PLC

(57) ABSTRACT

A polymerizable composition which can suppress generation of turbidity, optical distortion, and striae in a transparent resin obtained therefrom, a transparent resin obtained from the polymerizable composition, an optical material containing the transparent resin, a plastic lens containing the optical material, and a method for manufacturing the transparent resin. A polymerizable composition of the present disclosure contains a polythiol compound having at least three mercapto groups and a polyiso(thio)cyanate compound having at least one aromatic ring. A thiol equivalent ratio which is a measured value of a thiol equivalent of the polythiol compound with respect to a theoretical value of the thiol equivalent is 0.975 or more and less than 1.000.

11 Claims, No Drawings

(56) References Cited

FOREIGN PATENT DOCUMENTS

| | | |
|---|---|---|
| JP | 2012-017448 A | 1/2012 |
| JP | 2013-184996 A | 9/2013 |
| WO | 2007/052329 A1 | 5/2007 |
| WO | 2007/122810 A1 | 11/2007 |
| WO | 2010/067489 A1 | 6/2010 |

\* cited by examiner
† cited by third party

POLYMERIZABLE COMPOSITION, TRANSPARENT RESIN, OPTICAL MATERIAL, PLASTIC LENS, AND METHOD FOR MANUFACTURING TRANSPARENT RESIN

TECHNICAL FIELD

The present disclosure relates to a polymerizable composition containing a polythiol compound and a polyisocyanate compound, a transparent resin obtained from the polymerizable composition, an optical material containing the transparent resin, a plastic lens containing the optical material, and a method for manufacturing the transparent resin.

BACKGROUND ART

It is known that a plastic lens having a high refractive index is obtained by a reaction between a polyisocyanate compound and a polythiol compound. For example, Patent Literature 1 discloses a method for manufacturing a polyurethane plastic lens having a high refractive index by heating a composition obtained by mixing an aliphatic polyisocyanate compound and an aliphatic polythiol compound such as pentaerythritol tetrakis-(thioglycolate) or trimethylolpropane tris-(thioglycolate).

Patent Literature 2 discloses a method of using a tetrafunctional polythiol compound such as pentaerythritol tetrakis(thioglycolate) or pentaerythritol tetrakis(mercaptopropionate) together with a bifunctional polythiol compound having a thiol group in order to increase the crosslinking degree of a resin.

In addition, an ester compound of mercaptopropionic acid or mercaptoglycolic acid and a polyhydric alcohol is widely used as a polythiol compound which is a raw material of a plastic lens. As for a raw material of the ester compound, some literatures disclose a correlation among quality of the raw material, impurities contained in the raw material, and quality of an obtained lens.

For example, Patent Literatures 3 to 6 disclose that the following problem occurs when the amount of impurities contained in pentaerythritol and mercaptocarboxylic acid as raw materials of pentaerythritol mercaptocarboxylate is increased. When the amount of impurities is increased, viscosity of a polymerizable composition obtained by mixing pentaerythritol mercaptocarboxylate and a polyiso(thio)cyanate compound is increased, and it may be difficult to handle the polymerizable composition. In addition, when the amount of impurities is increased, for example, a hue of a lens may be worse, or turbidity may be generated in a lens disadvantageously.

Therefore, a method for manufacturing a plastic lens described in Patent Literature 3 suppresses turbidity of an obtained lens by setting the content of bispentaerythritol in pentaerythritol to 5.0% by mass or less. In addition, a method for manufacturing a plastic lens described in Patent Literature 4 suppresses turbidity of an obtained lens by setting the total content of sodium and calcium in pentaerythritol to 1.0% by mass or less and by setting the content of bispentaerythritol to 5.0% by mass or less. Furthermore, a method for manufacturing a plastic lens described in Patent Literature 5 suppresses turbidity of an obtained lens by setting the content of a bimolecular condensation thioester in mercaptocarboxylic acid to a predetermined value or less. In addition, a method for manufacturing a plastic lens described in Patent Literature 6 suppresses turbidity of an obtained lens by setting the total content of an alkali metal and an alkaline earth metal in pentaerythritol to 1.0% by mass or less.

CITATION LIST

Patent Literature

Patent Literature 1: JP 60-199016 A
Patent Literature 2: JP 63-46213 A
Patent Literature 3: JP 10-120646 A
Patent Literature 4: JP 2005-336104 A
Patent Literature 5: WO 2007/122810 A
Patent Literature 6: WO 2007/052329 A

SUMMARY

Technical Problem

However, according to methods described in Patent Literatures 1 and 2, a rate of polymerization between a polyisocyanate compound and a polythiol compound is high, and therefore reaction heat is high. Therefore, it is difficult to prevent generation of optical distortion and striae in an obtained plastic lens by thermal control of polymerization heat. Therefore, according to the methods described in Patent Literatures 1 and 2, optical distortion of a plastic lens may be increased to make it difficult to obtain a practical lens. Furthermore, according to the methods described in Patent Literatures 1 and 2, viscosity of a composition obtained by mixing a polyisocyanate compound and a polythiol compound is increased significantly with lapse of time, and therefore it may be difficult to inject the composition into a mold.

In addition, among plastic lenses obtained by a reaction between a polyisocyanate compound and a polythiol compound, a plastic lens obtained by polymerizing a polymerizable composition containing a polythiol compound having at least three mercapto groups and a polyiso(thio)cyanate compound having at least one aromatic ring is expected as a plastic lens having a high refractive index and low dispersion. However, according to methods described in Patent Literatures 3 to 6, it is impossible to suppress generation of turbidity, optical distortion, or striae in a plastic lens obtained by polymerizing a polymerizable composition containing a polythiol compound having at least three mercapto groups and a polyiso(thio)cyanate compound having at least one aromatic ring.

Therefore, an object of an Example of the present vend is to provide a polymerizable composition which can suppress generation of turbidity, optical distortion, and striae in a transparent resin obtained therefrom, a transparent resin obtained from the polymerizable composition, an optical material containing the transparent resin, a plastic lens containing the optical material, and a method for manufacturing the transparent resin.

Solution to Problem

The present inventors made intensive studies in order to solve the above problem. As a result, the present inventors have found that a polythiol compound having at least three mercapto groups generates turbidity, optical distortion, and striae in a transparent resin obtained by polymerizing a polymerizable composition containing a polythiol compound having at least three mercapto groups and a polyiso(thio)cyanate compound having at least one aromatic ring.

Intensive studies were further continued. As a result, surprisingly, the present inventors have found that the above problem can be solved by using a polythiol compound having at least three mercapto groups, having a value obtained by dividing a measured value of a thiol equivalent by a theoretical value of the thiol equivalent within a specific range. That is, the present disclosure is as follows.

[1] A polymerizable composition containing a polythiol compound having at least three mercapto groups and a polyiso(thio)cyanate compound having at least one aromatic ring, in which a thiol equivalent ratio which is a measured value of a thiol equivalent of the polythiol compound with respect to a theoretical value of the thiol equivalent is 0.975 or more and less than 1.000.

[2] A transparent resin obtained by polymerizing the polymerizable composition described in [1].

[3] An optical material containing the transparent resin described in [1] or [2].

[4] A plastic lens containing the optical material described in [3].

[5] A method for manufacturing a transparent resin, including a step of subjecting the polymerizable composition described in [1] to casting polymerization.

Advantageous Effects of Disclosure Embodiments

An Example of the present disclosure can provide a polymerizable composition which can suppress generation of turbidity, optical distortion, and striae in a transparent resin obtained therefrom, a transparent resin obtained from the polymerizable composition, an optical material containing the transparent resin, a plastic lens containing the optical material, and a method for manufacturing the transparent resin.

DESCRIPTION OF EMBODIMENTS

[Polymerizable Composition]

The present disclosure is a polymerizable composition containing a polythiol compound having at least three mercapto groups and a polyiso(thio)cyanate compound having at least one aromatic ring, in which a thiol equivalent ratio which is a measured value of a thiol equivalent of the polythiol compound with respect to a theoretical value of the thiol equivalent is 0.975 or more and less than 1.000. Hereinafter, the polymerizable composition of the present disclosure will be described in detail.

(Polythiol Compound Having at Least Three Mercapto Groups)

The polythiol compound having at least three mercapto groups, used for the polymerizable composition of the present disclosure is not particularly limited as long as being a compound used for manufacturing a transparent resin. Examples of the polythiol compound having at least three mercapto groups, used for the polymerizable composition of the present disclosure include an ester compound of a polyol compound such as pentaerythritol, glycerin, or trimethylol propane and an acid such as thioglycolic acid, mercaptopropionic acid, thiolactic acid, or thiosalicylic acid, 1,2,3-propanetrithiol, 1,2,3-trimercapto benzene, 1,2,4-trimercapto benzene, 1,3,5-trimercapto benzene, 1,2,3-tris (mercaptomethyl) benzene, 1,2,4-tris(mercaptomethyl) benzene, 1,3,5-tris(mercaptomethyl) benzene, 1,2,3-tris(2-mercaptoethyl) benzene, 1,2,4-tris(2-mercaptoethyl) benzene, 1,3,5-tris(2-mercaptoethyl) benzene, 1,2,3-tris(2-mercaptoethyleneoxy) benzene, 1,2,4-tris(2-mercaptoethyleneoxy) benzene, 1,3,5-tris(2-mercaptoethyleneoxy) benzene, 1,2,3,4-tetramercapto benzene, 1,2,3,5-tetramercapto benzene, 1,2,4,5-tetramercapto benzene, 1,2,3,4-tetrakis(mercaptomethyl) benzene, 1,2,3,5-tetrakis(mercaptomethyl) benzene, 1,2,4,5-tetrakis (mercaptomethyl) benzene, 1,2,3,4-tetrakis(2-mercaptoethyl) benzene, 1,2,3,5-tetrakis(2-mercaptoethyl) benzene, 1,2,4,5-tetrakis(2-mercaptoethyl) benzene, 1,2,3,4-tetrakis (2-mercaptoethyleneoxy) benzene, 1,2,3,5-tetrakis(2-mercaptoethyleneoxy) benzene, 1,2,4,5-tetrakis(2-mercaptoethyleneoxy) benzene, 1,2,3-tris(2-mercaptoethylthio) benzene, 1,2,4-tris(2-mercaptoethylthio) benzene, 1,3,5-tris (2-mercaptoethylthio) benzene, 1,2,3,4-tetrakis(2-mercaptoethylthio) benzene, 1,2,3,5-tetrakis(2-mercaptoethylthio) benzene, 1,2,4,5-tetrakis(2-mercaptoethylthio) benzene, 1,2,3-tris(2-mercaptoethylthio) propane, and tetrakis(2-mercaptoethylthiomethyl) methane. Note that examples of the ester compound of a polyol compound and an acid include trimethylolpropane tris(2-mercaptoacetate), trimethylolpropane tris(3-mercaptopropionate), pentaerythritol tetrakis(2-mercapto acetate), and pentaerythritol tetrakis(3-mercaptopropionate). These polythiol compounds may be used singly or in combination of two or more kinds thereof.

Among these polythiol compounds, an ester compound of a polyol compound and at least one selected from a group consisting of thioglycolic acid, mercaptopropionic acid, thiolactic acid, and thiosalicylic acid may have better because of reduced odors during polishing of an obtained transparent resin, or the like. In addition, the polyol compound may be at least one selected from a group consisting of pentaerythritol, glycerin, and trimethylol propane.

The polythiol compound contained in the polymerizable composition of the present disclosure may contain only a polythiol compound having at least three mercapto groups. In addition, the polythiol compound contained in the polymerizable composition of the present disclosure may contain a polythiol compound other than the polythiol compound having at least three mercapto groups within a range not impairing an effect of the present disclosure.

(Polyiso(Thio)Cyanate Compound Having at Least One Aromatic Ring)

The polyiso(thio)cyanate compound having at least one aromatic ring, used for the polymerizable composition of the present disclosure is not particularly limited as long as being a compound having at least one aromatic ring in one molecule, having two or more iso(thio)cyanate groups, and used for manufacturing a transparent resin. The polyiso (thio)cyanate compound having at least one aromatic ring may be an aromatic isocyanate. Examples of the polyiso (thio)cyanate compound include an aromatic polyisocyanate compound such as 1,2-diisocyanatobenzene, 1,3-diisocyanatobenzene, 1,4-diisocyanatobenzene, 2,4-diisocyanatotoluene, ethyl phenylene diisocyanate, isopropyl phenylene diisocyanate, dimethyl phenylene diisocyanate, diethyl phenylene diisocyanate, diisopropyl phenylene diisocyanate, trimethylbenzene triisocyanate, benzene triisocyanate, biphenyl diisocyanate, toluidine diisocyanate, 4,4'-methylene bis(phenyl isocyanate), 4,4'-methylene bis(2-methylphenyl isocyanate), bibenzyl-4,4'-diisocyanate, or bis(isocyanatophenyl) ethylene;

a polyisocyanate compound containing an aromatic ring compound, such as xylylene diisocyanate, bis(isocyanatoethyl) benzene, bis(isocyanatopropyl) benzene, α,α,α',α'-tetramethyl xylylene diisocyanate, bis(isocyanatobutyl) benzene, bis(isocyanatomethyl) naphthalene, or bis (isocyanatomethyl phenyl) ether;

an aromatic sulfide polyisocyanate compound such as 2-isocyanatophenyl-4-isocyanatophenyl sulfide, bis(4-isocyanatophenyl) sulfide, or bis(4-isocyanatomethyl phenyl) sulfide; an aromatic disulfide isocyanate compound such as bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(3-methoxy-4-isocyanatophenyl) disulfide, or bis(4-methoxy-3-isocyanatophenyl) disulfide; and an aromatic polyisothiocyanate compound such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4'-methylene bis(phenyl isothiocyanate), 4,4'-methylene bis(2-methylphenyl isothiocyanate), 4,4'-methylene bis(3-methylphenyl isothiocyanate), 4,4'-diisothiocyanatobenzophenone, 4,4'-diisothiocyanato-3,3'-dimethyl benzophenone, or bis(4-isothiocyanatophenyl) ether. These polyiso(thio)cyanate compounds may be used singly or in combination of two or more kinds thereof.

Among these polyiso(thio)cyanate compounds, at least one selected from a group consisting of tolylene diisocyanate, 4,4'-diphenylmethane diisocyanate, and phenylene diisocyanate may be from a viewpoint of suppressing generation of turbidity, optical distortion, and striae in an obtained transparent resin.

The polyiso(thio)cyanate compound contained in the polymerizable composition of the present disclosure may contain only a polyiso(thio)cyanate compound having at least one aromatic ring. In addition, the polyiso(thio)cyanate compound contained in the polymerizable composition of the present disclosure sure may contain another polyiso(thio)cyanate compound containing no aromatic ring in addition to the polyiso(thio)cyanate compound having at least one aromatic ring within a range not impairing an effect of the present disclosure.

The other polyisocyanate compound is not particularly limited as long as being a compound containing no aromatic ring, used for a transparent resin. Examples of the other polyiso(thio)cyanate compound include an aliphatic polyisocyanate compound such as hexamethylene diisocyanate, 2,2-dimethyl pentane diisocyanate, 2,2,4-trimethyl hexane diisocyanate, butene diisocyanate, 1,3-butadiene-1,4-diisocyanate, 2,4,4-trimethyl hexamethylene diisocyanate, 1,6,11-undecane triisocyanate, 1,3,6-hexamethylene triisocyanate, 1,8-diisocyanate-4-isocyanatomethyl octane, bis (isocyanatoethyl) carbonate, bis(isocyanatoethyl) ether, lysine diisocyanatomethyl ester, or lysine triisocyanate;

a sulfur-containing aliphatic polyisocyanate compound such as bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatoethyl) disulfide, bis(isocyanatopropyl) disulfide, bis(isocyanatomethyl thio) methane, bis(isocyanatoethyl thio) methane, bis(isocyanatomethyl thio) ethane, bis(isocyanatoethyl thio) ethane, 1,5-diisocyanate-2-isocyanatomethyl-3-apentane, 1,2,3-tris(isocyanatomethyl thio) propane, 1,2,3-tris(isocyanatoethyl thio) propane, 3,5-dithia-1,2,6,7-heptane tetraisocyanate, 2,6-diisocyanatomethyl-3,5-dithia-1,7-heptane diisocynate, 2,5-diisocyanatomethyl thiophene, or 4-isocyanatoethyl thio-2,6-dithia-1,8-octane diisocyanate;

an aliphatic polyisothiocyanate compound such as 1,2-diisothiocyanatoethane or 1,6-diisothiocyanatohexane; an alicyclic polyisothiocyanate compound such as cyclohexane diisothiocyanate;

a carbonyl isothiocyanate compound such as 1,3-benzene dicarbonyl diisothiocyanate, 1,4-benzene dicarbonyl diisothiocyanate, or (2,2-pyridine)-4,4-dicarbonyl diisothiocyanate; a sulfur-containing aliphatic iso(thio)cyanate compound such as thiobis(3-isothiocyanatopropane), thiobis(2-isothiocyanatoethane), or dithiobis(2-isothiocyanatoethane).

a sulfur-containing alicyclic polyisocyanate compound such as natomethyl-2-methyl-1,3-dithiolane; a sulfur-containing alicyclic compound such as 2,5-diisothiocyanatothiophene or 2,5-diisothiocyanato-1,4-dithiane; and a compound having an isocyanato group and an isothiocyanato group, such as 1-isocyanato-6-isothiocyanatohexane, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato 1,3,5-triazine, 4-isocyanatophenyl-4-isothiocyanatophenyl sulfide, or 2-isocyanatoethyl-2-isothiocyanatoethyl disulfide. These polyiso(thio)cyanate compounds may be used singly or in combination of two or more kinds thereof.

In addition to the polyiso (thio) cyanate compound having at least one aromatic ring, a halogen substitution product thereof such as a chlorine substitution product thereof or a bromine substitution product thereof, an alkyl substitution product thereof, alkoxy substitution product thereof, a nitro substitution product thereof, a prepolymer type modified product thereof with a polyhydric alcohol, a carbodiimide modified product thereof, a urea modified product thereof, a biuret modified product thereof, a dimerization or trimerization reaction product thereof, and the like can be used. These compounds may be used singly or in combination of two or more kinds thereof.

(Thiol Equivalent)

Here, a thiol equivalent of a polythiol compound is a value obtained by dividing the number of thiol groups included in one molecule by a molecular weight. A measured value of a thiol equivalent of a polythiol compound is a thiol equivalent obtained as follows.

To about 0.1 g of a polythiol compound, 30 mL of chloroform and 30 mL of 2-propanol are added to obtain a sample solution. To the sample solution, an iodine solution of 0.05 mol/L is dropwise added, and a point at which the brown color of the iodine solution dropwise added does not disappear is used as an end point. A measured value of a thiol equivalent is calculated from the following formula.

Thiol equivalent=(titer(mL)×factor of iodine solution)/(amount of sample(g)×10000)

Here, a theoretical value of a thiol equivalent of a polythiol compound is a calculation value obtained by dividing the number of thiol groups included in one molecule by a molecular weight.

A thiol equivalent ratio which is a measured value of a thiol equivalent of a polythiol compound having at least three mercapto groups with respect to a theoretical value of the thiol equivalent is 0.975 or more and less than 1.000, and may be 0.980 or more and 0.995 or less. When the above value is 0.975 or more and less than 1.000, it is possible to suppress generation of turbidity, optical distortion, and striae in a transparent resin obtained from a polymerizable composition.

Note that the thiol equivalent ratio is a value obtained by rounding off the fourth digit after the decimal point.

The polythiol compound having at least three mercapto groups contained in the polymerizable composition of the present disclosure may contain only a polythiol compound having at least three mercapto groups, in which a thiol equivalent ratio which is a measured value of a thiol equivalent of a polythiol compound with respect to a theoretical value of the thiol equivalent is 0.975 or more and less than 1.000. In addition, the polythiol compound having at least three mercapto groups contained in the polymerizable composition of the present disclosure may contain a polythiol compound having at least three mercapto groups, in which a thiol equivalent ratio which is a measured value of a thiol equivalent of a polythiol compound with respect to a theoretical value of the thiol equivalent is less than 0.975 within a range not impairing an effect of the disclosure embodiments.

(Use Ratio)

A use ratio between a polythiol compound having at least three mercapto groups and a polyiso(thio)cyanate compound having at least one aromatic ring may be within a range of a SH group/NCO group=0.3 to 2.0, and within a range of a SH group/NCO group=0.7 to 1.5.

(Other Components)

The polymerizable composition of the present disclosure may contain only a polythiol compound having at least three mercapto groups and a polyiso(thio)cyanate compound having at least one aromatic ring. However, the polymerizable composition of the present disclosure may contain a compound other than the polythiol compound having at least three mercapto groups and the polyiso(thio)cyanate compound having at least one aromatic ring within a range not impairing an effect of the present disclosure, as necessary. Examples of such a compound include a compound copolymerizable with the above compounds, an active hydrogen compound such as an amine, an epoxy compound, an olefin compound, a carbonate compound, an ester compound, a metal, a metal oxide, an organic metal compound, and an inorganic substance. These compounds may be used singly or in combination of two or more kinds thereof.

In addition, various substances such as a chain extender, a crosslinker, a light stabilizer, an ultraviolet absorber, an antioxidant, an oil-soluble dye, a filler, a release agent, or a bluing agent may be added to the polymerizable composition of the present disclosure according to a purpose. In addition, in order to adjust a reaction rate to a desired reaction rate, a known reaction catalyst used in manufacturing polyurethane can be added appropriately to the polymerizable composition of the present disclosure.

[Transparent Resin]

The transparent resin of the present disclosure is obtained by polymerizing the polymerizable composition of the present disclosure. A ratio of the total number of urethane bonds with respect to the total number of thiourethane bonds contained in the transparent resin may be 0.026 or less, and 0.020 or less. When the ratio of the total number of urethane bonds with respect to the total number of thiourethane bonds is 0.026 or less, optical distortion or striae is hardly generated disadvantageously in the transparent resin even when the transparent resin has a large central thickness or a large peripheral thickness. Hereinafter, a method for manufacturing the transparent resin of the present disclosure will be exemplified.

(Method for Manufacturing Transparent Resin)

A method for manufacturing the transparent resin of the present disclosure, includes a step of subjecting the polymerizable composition of the present disclosure to casting polymerization. Specifically, first, a polymerizable composition is manufactured by mixing a polythiol compound having at least three mercapto groups and a polyiso(thio)cyanate compound having at least one aromatic ring. The polymerizable composition is degassed, as necessary. Thereafter, the polymerizable composition is injected into a mold, and the polymerizable composition which has been injected into the mold is polymerized. For example, a mold formed of glass or metal is used for the mold. When the polymerizable composition is polymerized in the mold, for example, polymerization time is from 3 to 96 hours, and a polymerization temperature is from 0 to 130° C. In order to improve a releasing property of the transparent resin manufactured by polymerizing the polymerizable composition from the mold, a release agent may be applied to a release surface of the mold, or a release agent may be added to the polymerizable composition.

Turbidity, optical distortion, or striae is hardly observed in the transparent resin obtained in this manner. In addition, the transparent resin has a high refractive index and low dispersion, further has excellent heat resistance, durability, and impact resistance, and has a light weight. Therefore, the transparent resin of the present disclosure may be used as an optical material of an optical element such as a lens for eyeglasses or a lens for a camera.

[Optical Material]

The optical material of the present disclosure contains the transparent resin of the present disclosure. Therefore, turbidity, optical distortion, or striae is hardly observed in the optical material of the present disclosure. In addition, the optical material of the present disclosure has a high refractive index and low dispersion, further has excellent heat resistance, durability, and impact resistance, and has a light weight. The optical material of the present disclosure sure may contain only the transparent resin of the present disclosure, or may contain another transparent resin. Examples of the other transparent resin include polymethyl methacrylate, polycarbonate, a cycloolefin polymer, an acrylic resin, a fluorine resin, polyimide, an epoxy resin, a styrene polymer, polyethylene terephthalate, and polyethylene.

[Plastic Lens]

The plastic lens of the present disclosure contains the optical material of the present disclosure. Therefore, turbidity, optical distortion, or striae is hardly observed in the plastic lens of the present disclosure. In addition, the plastic lens of the present disclosure has a high refractive index and low dispersion, further has excellent heat resistance, durability, and impact resistance, and has a light weight. The plastic lens of the present disclosure may contain only the optical material of the present disclosure, or may contain another optical material.

In order to impart anti-reflection or high hardness, improve wear resistance, improve chemical resistance, or impart an anti-fogging property or a fashion property, the plastic lens of the present disclosure may be subjected to a physical or chemical treatment such as surface polishing, an antistatic treatment, a hard coat treatment, a non-reflective coat treatment, a dyeing treatment, or a dimming treatment, as necessary.

In the present disclosure, as for the examples of components, contents, and physical properties, matters exemplified or described as a range in the detailed description of the disclosure may be combined with each other arbitrarily.

In addition, by adjusting the composition described in Examples so as to be the composition described in the detailed description of the disclosure, the disclosure can be performed in a similar manner to Examples in the entire claimed composition range.

EXAMPLES

Hereinafter, the present disclosure will be described more specifically based on Examples, but the present disclosure is not limited to the Examples.

A refractive index, Abbe number, transparency, optical distortion, and striae were evaluated for plastic lenses in Examples and Comparative Examples.

(Refractive Index and Abbe Number)

A refractive index of a plastic lens was measured for light having a wavelength of F' line (488.0 nm), C' line (643.9 nm) or e-line (546.1 nm) using a KPR-2000 type precision refractometer manufactured by Kalnew optical Industry Co., Ltd. At 20° C. Abbe number was calculated from the following formula.

$$\text{Abbe number } v_e = (n_e - 1)/(n_{F'} - n_{C'})$$

$n_e$ indicates a refractive index measured with light having a wavelength of e-line. $N_{F'}$ indicates a refractive index measured with light having a wavelength of F' line. $N_{C'}$ indicates a refractive index measured with light having a wavelength of C' line.

(Transparency)

The resulting plastic lens was visually observed under a fluorescent lamp in the dark, and transparency of the plastic lens was evaluated in the following three stages.

No fogging or precipitation of an opaque substance is observed: VG (Very Good)

Fogging and/or precipitation of an opaque substance is slightly observed: G (Good)

Terrible fogging or precipitation of an opaque substance is clearly observed: B (Bad)

A plastic lens having an evaluation result of VG or G has no practical problem in transparency. On the other hand, a plastic lens having an evaluation result of B is unsuitable practically.

(Optical Distortion)

The resulting plastic lens was visually observed using a strain scope, and optical distortion of the plastic lens was evaluated in the following three stages.

No optical distortion is observed: VG (Very Good)

Optical distortion is slightly observed: G (Good)

Much optical distortion is observed: B (Bad)

A plastic lens having an evaluation result of VG or G has no practical problem in optical distortion. On the other hand, a plastic lens having an evaluation result of B is unsuitable practically.

(Striae)

The resulting plastic lens was visually observed by a schlieren method, and striae of the plastic lens was evaluated in the following three stages.

No striae is observed: VG (Very Good)

Striae is slightly observed: G (Good)

Much striae is observed: B (Bad)

A plastic lens having an evaluation result of VG or G has no practical problem in striae. On the other hand, a plastic lens having an evaluation result of B is unsuitable practically.

A theoretical value of a thiol equivalent of a polythiol compound used in manufacturing each of plastic lenses in Examples and Comparative Examples was calculated as follows, and a measured value was measured as follows. A thiol equivalent ratio was calculated using these results.

(Theoretical Value of Thiol Equivalent and Measured Value Thereof)

A theoretical value of a thiol equivalent was calculated by dividing the number of thiol groups included in one molecule of a polythiol compound used in manufacturing a plastic lens by a molecular weight. In addition, a measured value of a thiol equivalent of a polythiol compound used in manufacturing a plastic lens was measured by the following method.

To about 0.1 g of a polythiol compound, 30 mL of chloroform and 30 mL of 2-propanol were added to obtain a sample solution. To the sample solution, an iodine solution of 0.05 mol/L was dropwise added, and a point at which the brown color of the iodine solution dropwise added did not disappear was used as an end point. A measured value of a thiol equivalent was calculated from the following formula.

$$\text{Thiol equivalent(meq/g)} = (\text{titer(mL)} \times \text{factor of iodine solution})/(\text{amount of sample(g)} \times 10)$$

(Thiol Equivalent Ratio)

A thiol equivalent ratio was calculated by dividing a measured value of a thiol equivalent of a polythiol compound having at least three mercapto groups by a theoretical value of the thiol equivalent.

Subsequently, plastic lenses in Examples and Comparative Examples were manufactured as follows.

Example 1

A mixture obtained by thoroughly stirring and mixing 49.7 parts by weight of pentaerythritol tetrakismercaptoacetate (hereinafter, referred to as PETMA), 50.7 parts by weight of tolylene diisocyanate (hereinafter referred to as TDI), 0.02 parts by weight of dimethyl tin dichloride, and 0.30 parts by weight of a mixture of butoxyethyl acid phosphate and dibutoxyethyl acid phosphate (trade name: JP-506 manufactured by Johoku Chemical Co., Ltd.) at room temperature was degassed under a reduced pressure of 5 mmHg to prepare a homogeneous monomer mixture. The monomer mixture was injected into a mold formed of a pair of glass molds and a resin gasket. Note that the above pair of glass molds had an upper mold curvature of 600 mm and a lower mold curvature of 120 mm, and the mold was assembled such that a plastic lens had a central thickness of 5 mm and a diameter of 75 mm.

After the monomer mixture was injected into the mold, the temperature was raised from 20° C. to 120° C. over 15 hours, heating polymerization was performed at 120° C. for four hours, cooling was performed, and a plastic lens was taken out from the mold to obtain a plastic lens in Example 1.

Example 2

A polymerizable composition was prepared in a similar manner to Example 1 to manufacture a plastic lens in Example 2 except that 55.0 parts by weight of trimethylolpropane tris(3-mercaptopropionate) (hereinafter, referred to as TMTP) and 45.8 parts by weight of TDI were used in place of 49.7 parts by weight of PETMA and 50.7 parts by weight of TDI.

Example 3

A polymerizable composition was prepared in a similar manner to Example 1 to manufacture a plastic lens in Example 3 except that 116.8 parts by weight of pentaerythritol tetrakismercaptopropionate (hereinafter, referred to as PETMP) and 87.4 parts by weight of TDI were used in place of 49.7 parts by weight of PETMA and 50.7 parts by weight of TDI.

Example 4

A polymerizable composition was prepared in a similar manner to Example 1 to manufacture a plastic lens in Example 4 except that 58.9 parts by weight of 2,3-dimercaptoethylthio-1-mercaptopropane (hereinafter, referred to as DMMTP) and 59.1 parts by weight of TDI were used in place of 49.7 parts by weight of PETMA and 50.7 parts by weight of TDI.

Example 5

A polymerizable composition was prepared in a similar manner to Example 1 to manufacture a plastic lens in Example 5 except that 33.4 parts by weight of PETMA, 32.8 parts by weight of dimercaptomethyl dithiane (hereinafter, referred to as DMMD), and 53.8 parts by weight of TDI were used in place of 49.7 parts by weight of PETMA and 50.7 parts by weight of TDI.

Example 6

A polymerizable composition was prepared in a similar manner to Example 1 to manufacture a plastic lens in Example 6 except that 117.5 parts by weight of PETMP, 46.6 parts by weight of TDI, and 37.9 parts by weight of hexamethylene diisocyanate (hereinafter, referred to as HDI) were used in place of 49.7 parts by weight of PETMA and 50.7 parts by weight of TDI.

Example 7

A polymerizable composition was prepared in a similar manner to Example 1 to manufacture a plastic lens in Example 7 except that 54.5 parts by weight of PETMA, 20.9 parts by weight of diphenylmethane diisocyanate (hereinafter, referred to as MDI), and 27.1 parts by weight of HDI were used in place of 49.7 parts by weight of PETMA and 50.7 parts by weight of TDI.

Example 8

A polymerizable composition was prepared in a similar manner to Example 1 to manufacture a plastic lens in Example 8 except that 52.0 parts by weight of PETMP, 20.6 parts by weight of MDI, and 25.0 parts by weight of HDI were used in place of 49.7 parts by weight of PETMA and 50.7 parts by weight of TDI.

Example 9

A polymerizable composition was prepared in a similar manner to Example 1 to manufacture a plastic lens in Example 9 except that 59.4 parts by weight of 1,2,4-tris (mercaptomethyl) cyclohexane (hereinafter, referred to as MMCH) and 50.6 parts by weight of TDI were used in place of 49.7 parts by weight of PETMA and 50.7 parts by weight of TDI.

Example 10

A polymerizable composition was prepared in a similar manner to Example 1 to manufacture a plastic lens in Example 10 except that 35.5 parts by weight of PETMA, 26.8 parts by weight of PETMP, and 47.7 parts by weight of TDI were used in place of 49.7 parts by weight of PETMA and 50.7 parts by weight of TDI.

Example 11

A polymerizable composition was prepared in a similar manner to Example 1 to manufacture a plastic lens in Example 11 except that 113.0 parts by weight of PETMP and 87.0 parts by weight of xylylenediisocyanate (hereinafter, referred to as XDI) were used in place of 49.7 parts by weight of PETMA and 50.7 parts by weight of TDI.

Example 12

A polymerizable composition was prepared in a similar manner to Example 1 to manufacture a plastic lens in Example 12 except that 120.2 parts by weight of DMMTP and 130.8 parts by weight of XDI were used in place of 49.7 parts by weight of PETMA and 50.7 parts by weight of TDI.

Comparative Example 1

A polymerizable composition was prepared in a similar manner to Example 1 to manufacture a plastic lens in Comparative Example 1 except that PETMA different from PETMA used in Example 1 was used.

Comparative Example 2

A polymerizable composition was prepared in a similar manner to Example 2 to manufacture a plastic lens in Comparative Example 2 except that TMTP different from TMTP used in Example 2 was used.

Comparative Example 3

A polymerizable composition was prepared in a similar manner to Example 3 to manufacture a plastic lens in Comparative Example 3 except that PETMP different from PETMP used in Example 3 was used.

Comparative Example 4

A polymerizable composition was prepared in a similar manner to Example 7 to manufacture a plastic lens in Comparative Example 4 except that PETMA different from PETMA used in Example 7 was used.

Comparative Example 5

A polymerizable composition was prepared in a similar manner to Example 10 to manufacture a plastic lens in Comparative Example 5 except that PETMA different from PETMA used in Example 10 was used and PETMP different from PETMP used in Example 10 was used.

Comparative Example 6

A polymerizable composition was prepared in a similar manner to Comparative Example 5 to manufacture a plastic lens in Comparative Example 6 except that PETMA different from PETMA used in Comparative Example 5 was used.

Comparative Example 7

A polymerizable composition was prepared in a similar manner to Example 11 to manufacture a plastic lens in Comparative Example 7 except that PETMP different from PETMP used in Example 11 was used.

(Result)
The following Table 1 indicates a thiol equivalent of a polythiol compound used for manufacturing each of plastic lenses in Examples and Comparative Examples, and a thiol equivalent ratio thereof.

TABLE 1

Thiol equivalent of polythiol compound and thiol equivalent ratio thereof

|  | Isocyanate | Polythiol compound | Measured value of thiol equivalent (a) (meq/g) | Theoretical value of thiol equivalent (b) (meq/g) | Thiol equivalent ratio (a)/(b) |
|---|---|---|---|---|---|
| Example 1 | TDI | PETMA | 9.092 | 9.247 | 0.983 |
| Example 2 | TDI | TMTP | 7.448 | 7.527 | 0.989 |
| Example 3 | TDI | PETMP | 8.004 | 8.186 | 0.978 |
| Example 4 | TDI | DMMTP | 11.382 | 11.516 | 0.988 |
| Example 5 | TDI | PETMA DMMD | 9.092 — | 9.247 — | 0.983 — |
| Example 6 | TDI, HDI | PETMP | 8.031 | 8.186 | 0.981 |
| Example 7 | MDI, HDI | PETMA | 9.092 | 9.247 | 0.983 |
| Example 8 | MDI, HDI | PTEMP | 8.031 | 8.186 | 0.981 |
| Example 9 | TDI | MMCH | 13.175 | 13.488 | 0.977 |
| Example 10 | TDI | PETMA PETMP | 9.092 8.031 | 9.247 8.186 | 0.983 0.981 |
| Example 11 | XDI | PETMP | 8.031 | 8.186 | 0.981 |
| Example 12 | XDI | DMMTP | 11.382 | 11.516 | 0.988 |
| Comparative Example 1 | TDI | PETMA | 8.978 | 9.247 | 0.971 |
| Comparative Example 2 | TDI | TMTP | 7.265 | 7.527 | 0.965 |
| Comparative Example 3 | TDI | PETMP | 7.943 | 8.186 | 0.970 |
| Comparative Example 4 | MDI, HDI | PETMA | 8.962 | 9.247 | 0.969 |
| Comparative Example 5 | TDI | PETMA PETMP | 9.015 7.943 | 9.247 8.186 | 0.975 0.970 |
| Comparative Example 6 | TDI | PETMA PETMP | 8.927 7.943 | 9.247 8.186 | 0.965 0.970 |
| Comparative Example 7 | XDI | PETMP | 7.943 | 8.186 | 0.970 |

Table 2 indicates an evaluation result of a refractive index, Abbe number, transparency, optical distortion, and striae in plastic lenses in Examples and Comparative Examples. Note that VG, G, or B as an evaluation result has a meaning described above.

Plastic lenses in Examples 1 to 12 exhibited satisfactory results in all the evaluation items of a refractive index, Abbe number, transparency, optical distortion, and striae. On the other hand, plastic lenses in Comparative Examples 1 to 4 and 6 exhibited satisfactory results in the evaluation items of

TABLE 2

Evaluation result of plastic lenses in Examples and Comparative Examples

|  | Refractive index $n_e$ | Abbe number $v_e$ | Transparency | Optical distortion | Striae |
|---|---|---|---|---|---|
| Example 1 | 1.61 | 30 | VG | VG | VG |
| Example 2 | 1.61 | 30 | VG | VG | VG |
| Example 3 | 1.61 | 31 | VG | VG | VG |
| Example 4 | 1.66 | 30 | VG | VG | VG |
| Example 5 | 1.65 | 30 | VG | VG | VG |
| Example 6 | 1.59 | 32 | VG | VG | VG |
| Example 7 | 1.60 | 32 | VG | VG | VG |
| Example 8 | 1.60 | 31 | VG | VG | VG |
| Example 9 | 1.66 | 36 | VG | VG | VG |
| Example 10 | 1.60 | 35 | VG | VG | VG |
| Example 11 | 1.60 | 36 | VG | VG | G |
| Example 12 | 1.66 | 33 | VG | VG | G |
| Comparative Example 1 | 1.61 | 30 | VG | B | B |
| Comparative Example 2 | 1.61 | 30 | G | B | B |
| Comparative Example 3 | 1.61 | 31 | VG | B | B |
| Comparative Example 4 | 1.60 | 32 | G | B | B |
| Comparative Example 5 | 1.60 | 35 | VG | G | B |
| Comparative Example 6 | 1.60 | 35 | VG | B | B |
| Comparative Example 7 | 1.60 | 36 | VG | G | B | a refractive index, Abbe number, and transparency, but exhibited unsatisfactory results in the evaluation items of optical distortion and striae. In addition, plastic lenses in Comparative Examples 5 and 7 exhibited satisfactory results in the evaluation items of a refractive index, Abbe number, transparency, and optical distortion, but exhibited unsatisfactory results in striae.

Finally, the present disclosure will be summarized.

The polymerizable composition of the present disclosure contains a polythiol compound having at least three mercapto groups and a polyiso(thio)cyanate compound having at least one aromatic ring. A thiol equivalent ratio which is a measured value of a thiol equivalent of the polythiol compound with respect to a theoretical value of the thiol equivalent is 0.975 or more and less than 1.000.

When the thiol equivalent ratio which is a measured value of a thiol equivalent of the polythiol compound with respect to a theoretical value of the thiol equivalent is 0.975 or more and less than 1.000, it is possible to suppress generation of turbidity, optical distortion, and striae in a transparent resin obtained from a polymerizable composition.

Among the polythiol compounds, an ester compound of a polyol compound and at least one selected from the group consisting of thioglycolic acid, mercaptopropionic acid, thiolactic acid, and thiosalicylic acid may have better. In addition, the above polyol compound may be at least one selected from the group consisting of pentaerythritol, glycerin, and trimethylol propane.

Among the polyiso(thio)cyanate compounds, at least one selected from the group consisting of tolylene diisocyanate, 4,4'-diphenylmethane diisocyanate, and phenylene diisocyanate may have better.

The transparent resin of the present disclosure is obtained by polymerizing the polymerizable composition of the present disclosure.

The plastic lens of the present disclosure contains an optical material obtained by polymerizing the polymerizable composition.

Embodiments disclosed herein are exemplary in all respects, and it should be considered that the embodiments are not restrictive. The scope of the present disclosure is defined not by the above description but by claims, and intends to include all modifications within meaning and a scope equal to claims.

The invention claimed is:

1. A polymerizable composition comprising: a polythiol compound having at least three mercapto groups; and a polyiso(thio)cyanate compound having at least one aromatic ring, wherein
   a thiol equivalent ratio which is a measured value of a thiol equivalent of the polythiol compound with respect to a theoretical value of the thiol equivalent is 0.975 or more and 0.989 or less.

2. The polymerizable composition according to claim 1, wherein the polythiol compound is an ester compound of a polyol compound and at least one selected from a group consisting of thioglycolic acid, mercaptopropionic acid, thiolactic acid, and thiosalicylic acid.

3. The polymerizable composition according to claim 2, wherein the polyol compound is at least one selected from a group consisting of pentaerythritol, glycerin, and trimethylol propane.

4. The polymerizable composition according to claim 1, wherein the polyiso(thio)cyanate compound having at least one aromatic ring is an aromatic isocyanate.

5. The polymerizable composition according to claim 4, wherein the aromatic isocyanate is at least one selected from a group consisting of tolylene diisocyanate, 4,4'-diphenylmethane diisocyanate, and phenylene diisocyanate.

6. A transparent resin obtained by polymerizing the polymerizable composition according to claim 1.

7. The transparent resin according to claim 6, wherein a ratio of the total number of urethane bonds with respect to the total number of thiourethane bonds contained in the transparent resin is 0.026 or less.

8. An optical material comprising the transparent resin according to claim 6.

9. A plastic lens comprising the optical material according to claim 8.

10. A method for manufacturing a transparent resin, comprising a step of subjecting the polymerizable composition according to claim 1 to casting polymerization.

11. The polymerizable composition according to claim 1, wherein the thiol equivalent ratio is 0.980 or more and 0.989 or less.

* * * * *